United States Patent
Kim et al.

(10) Patent No.: US 8,908,052 B2
(45) Date of Patent: Dec. 9, 2014

(54) METHOD AND APPARATUS FOR CORRECTING SHAKINESS

(75) Inventors: Sung-min Kim, Suwon-si (KR); Jin-gi Lee, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 642 days.

(21) Appl. No.: 12/949,169

(22) Filed: Nov. 18, 2010

(65) Prior Publication Data

US 2011/0134259 A1 Jun. 9, 2011

(30) Foreign Application Priority Data

Dec. 3, 2009 (KR) .................. 10-2009-0119102

(51) Int. Cl.
*H04N 5/232* (2006.01)

(52) U.S. Cl.
CPC ....... *H04N 5/23248* (2013.01); *H04N 5/23258* (2013.01); *H04N 5/23261* (2013.01)
USPC ..................................... 348/208.4

(58) Field of Classification Search
CPC .............................. H04N 5/23248
USPC .............................. 348/208.1, 208.4; 396/55
See application file for complete search history.

(56) References Cited

U.S. PATENT DOCUMENTS

| | | | |
|---|---|---|---|
| 5,937,214 A * | 8/1999 | Shintani et al. | 396/55 |
| 7,653,293 B2 | 1/2010 | Masuda | |
| 7,830,416 B2 | 11/2010 | Tanaka et al. | |
| 7,864,213 B2 * | 1/2011 | Jeong et al. | 348/208.4 |
| 7,945,148 B2 * | 5/2011 | Lee | 396/52 |
| 2004/0240867 A1 * | 12/2004 | Hara | 396/55 |
| 2008/0152332 A1 * | 6/2008 | Koo et al. | 396/55 |
| 2009/0245772 A1 * | 10/2009 | Lee et al. | 396/55 |
| 2010/0232774 A1 * | 9/2010 | Lee | 396/52 |

FOREIGN PATENT DOCUMENTS

| | | |
|---|---|---|
| CN | 101021667 A | 8/2007 |
| CN | 101310522 A | 11/2008 |
| JP | 07-028146 A | 1/1995 |

OTHER PUBLICATIONS

Office Action issued for CN 201010579629.8 (May 14, 2014).

* cited by examiner

*Primary Examiner* — Gary C Vieaux
(74) *Attorney, Agent, or Firm* — Drinker Biddle & Reath LLP

(57) ABSTRACT

Provided is a method, apparatus, and computer readable medium for correcting shakiness, in which the method includes generating using a hall sensor a hall sensor signal corresponding to displacement caused by a shock; determining whether the hall sensor signal exceeds a first threshold value; generating a shakiness correction control signal according to a result of the determination; and performing shakiness correction according to the shakiness correction control signal.

20 Claims, 5 Drawing Sheets

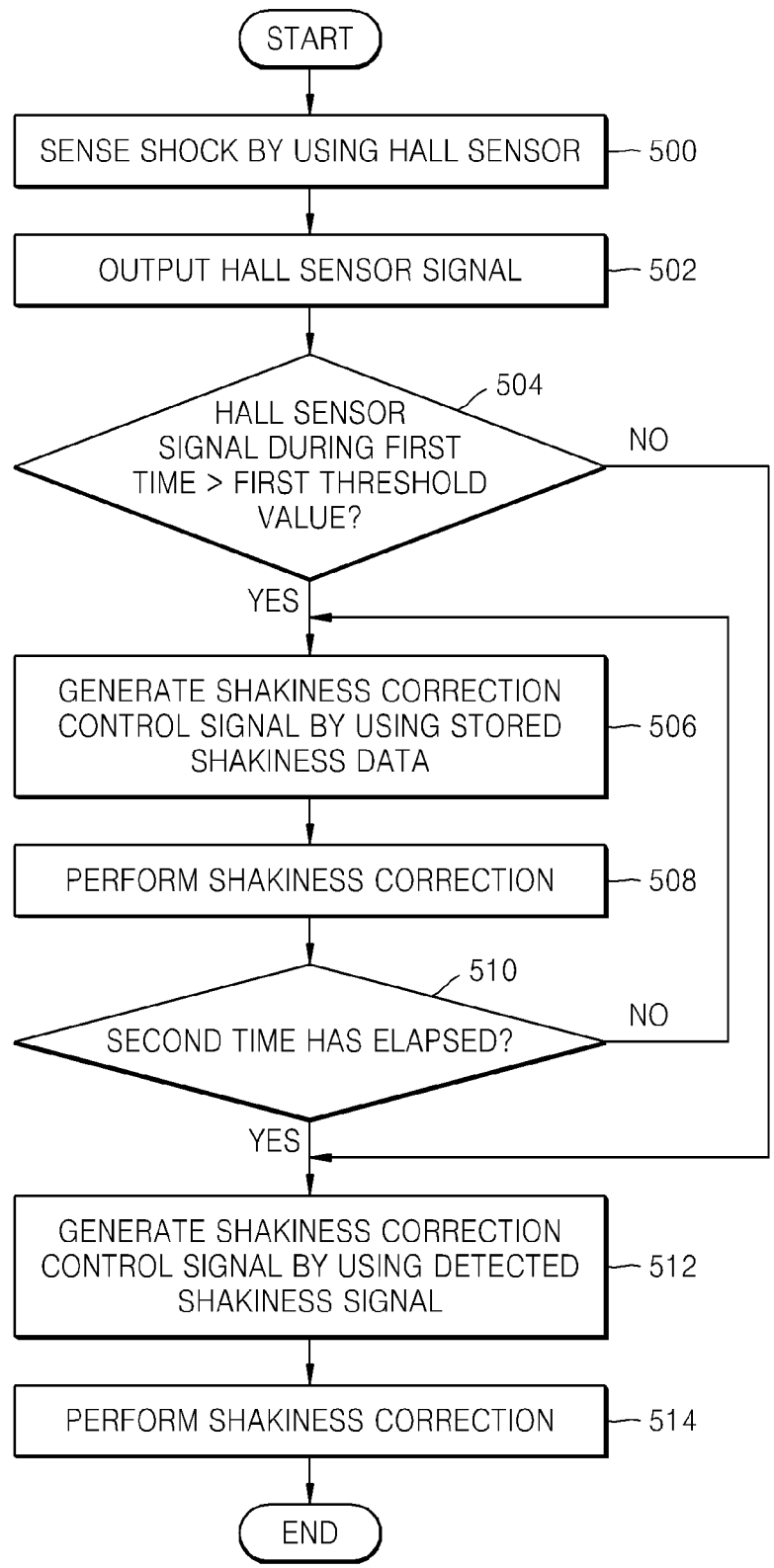

METHOD AND APPARATUS FOR CORRECTING SHAKINESS

CROSS-REFERENCE TO RELATED PATENT APPLICATION

This application claims the benefit of Korean Patent Application No. 10-2009-0119102, filed on Dec. 3, 2009, in the Korean Intellectual Property Office, the entire disclosure of which is incorporated herein by reference.

BACKGROUND

1. Field of the Invention

Embodiments of the invention relates to a digital photographing device, and more particularly, to a method and apparatus for correcting shakiness in a digital photographing device.

2. Description of the Related Art

When an image is captured with a camera, a shake from the hand or body of a user of the camera often delivers a shake to the camera which may make the captured image blurred. Typically, the motion of the camera may be classified into two types as described below.

The first motion type is up-down motion on the axis of a camera lens, and the second motion type is left-right motion on the axis of the camera lens. The up-down motion is called pitching and the left-right motion is called yawing. Each time a user captures an image by pressing a shutter button of the camera, the pressing of the shutter button may cause the camera to move up-down (pitch) or move left-right (yaw.)

Some cameras move a lens or a charged coupled device (CCD) to correct for the motion (or shake) of the camera. The cameras may use a shakiness correcting function to control the motion of the lens or CCD. For example, optical image stabilization (OIS), digital image stabilization (DIS), or electronic image stabilization (EIS), may be used to obtain stabilized images.

The OIS, which is a representative shakiness correction technique and can be classified into two types. First, a CCD moves in an opposite direction to the shakiness, so that an image formed on the CCD can maintain its position despite the movement of the camera body. Second, a lens shift type has the same basic principle as the CCD shift type, but a correction lens moves so that an imaged formed on the CCD can maintain its position despite the movement of the camera body.

Often, users of cameras evaluate the quality of a camera based on the images captured by the camera without regard for whether or not the camera was shaken.

SUMMARY

Therefore there is a need in the art for an apparatus, computer readable medium, and a method of correcting shakiness, the method including generating using a hall sensor a hall sensor signal corresponding to displacement caused by a shock; determining whether the hall sensor signal exceeds a first threshold value; generating a shakiness correction control signal according to a result of the determination; and performing shakiness correction according to the shakiness correction control signal.

The determining step may include determining whether the hall sensor signal exceeds the first threshold value during a first time period.

The step generating a shakiness correction may include generating a shakiness correction control signal for performing shakiness correction using previously stored shakiness data until a second time has elapsed if the hall sensor signal exceeds the first threshold value during the first time period.

The method may include generating a shakiness signal, and wherein the step generating a shakiness correction further comprises generating the shakiness correction control signal using the generated shakiness signal.

The step generating a shakiness correction control signal may include generating a shakiness correction control signal using the generated shakiness signal if the hall sensor signal does not exceed the first threshold value during the first time period.

The stored shakiness data may be obtained by patterning the generated shakiness signal.

The shock may be caused by an operation of a shutter or a mirror.

The method may include generating a shakiness signal, wherein the step generating a shakiness correction control signal comprises: if the hall sensor signal exceeds the first threshold value for a second time period, generating a shakiness correction control signal for performing shakiness correction using previously stored shakiness data until a first time period has elapsed, and if the hall sensor signal does not exceed the first threshold value for the second time period, generating the shakiness correction control signal for performing shakiness correction using the generated shakiness signal.

The hall sensor may be configured to measure the shake of a movable part which is moved in response to the shakiness correction control signal and the step generating a shakiness signal is performed by a device configured to measure the shake of an apparatus the method is performed on.

Embodiments of the invention include an apparatus for correcting shakiness may include a hall sensor configured to output a hall sensor signal corresponding to displacement caused by a shock; a control unit configured to determine whether the hall sensor signal exceeds a first threshold value and to generate a shakiness correction control signal according to a result of the determination; and a shakiness correction unit configured to perform shakiness correction according to the shakiness correction control signal.

The control unit may be configured to determine whether the hall sensor signal exceeds the first threshold value during a first time period.

The apparatus may include a storing unit storing shakiness data for generating the shakiness correction control signal, wherein the control unit is configured to generate the shakiness correction control signal for performing shakiness correction using the previously stored shakiness data until a second time period has elapsed if the hall sensor signal exceeds the first threshold value during the first time period.

The apparatus may include a shakiness detection unit configured to generate a shakiness signal, wherein the control unit is configured to generate the shakiness correction control signal using the shakiness signal generated by the shakiness detection unit.

The control unit may be further configured to generate the shakiness correction control signal by using the shakiness signal generated by the shakiness detection unit if the hall sensor signal does not exceed the first threshold value during the first time period.

The control unit may be configured to obtain the shakiness data by patterning the shakiness signal generated by the shakiness detection unit.

The shock may be caused by an operation of a shutter or a mirror.

The apparatus may include a shake detection unit configured to generate a shakiness signal, wherein the control unit is further configured to: generate a shakiness correction control signal for performing shakiness correction using previously stored shakiness data until a second time period has elapsed, if the hall sensor signal exceeds the first threshold value during the first time period, and generate the shakiness correction control signal for performing shakiness correction using the generated shakiness signal, if the hall sensor signal does not exceed the first threshold value during the first time period.

The hall sensor may be configured to measure the shake of a device configured to move in response to the shakiness correction control signal and the shake detection unit is configured to generate the shakiness signal based on measuring the shake of the apparatus.

Embodiments of the invention include a recoding medium having recorded thereon a program for executing a method of claim 1 on a computer.

BRIEF DESCRIPTION OF THE DRAWINGS

The above and other features and advantages of the invention will become more apparent by describing in detail exemplary embodiments thereof with reference to the attached drawings in which:

FIG. 5 is a flowchart illustrating a method of correcting shakiness according to another embodiment of the invention.

DETAILED DESCRIPTION

Hereinafter, exemplary embodiments of the invention will be described in detail with reference to the accompanying drawings. In the following description, only some parts of the invention will be described.

Figure 1:
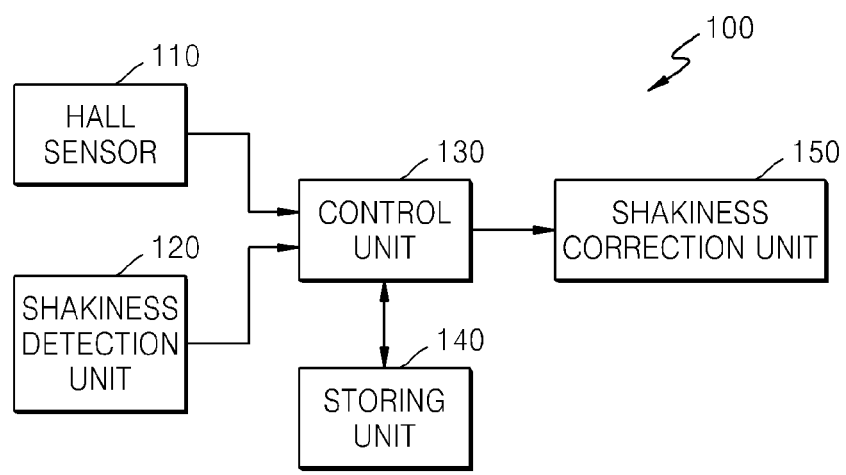
FIG. 1 is a block diagram of an apparatus for correcting shakiness 100 according to an embodiment of the invention.

FIG. 1 is a block diagram of an apparatus 100 for correcting shakiness according to an embodiment of the invention.

Referring to FIG. 1, the apparatus 100 includes a hall sensor 110, a shakiness detection unit 120, a control unit 130, a storing unit 140, and a shakiness correction unit 150. The apparatus 100 is mounted on a digital photographing device, such as a digital compact camera (DSC), a digital single-lens reflex (DSLR) camera, a camcorder, or the like, to correct shakiness occurring in photographing. The apparatus 100 according to an embodiment of the invention may be used in both a lens-body integrated type and a lens-body separated type of shakiness correction, and may be mounted on a lens side or a body side.

Figure 2A:
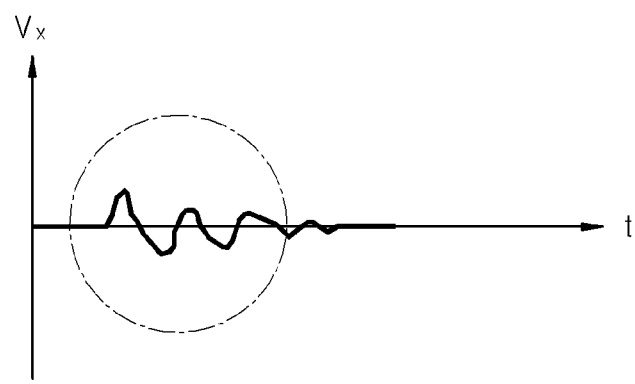
FIGS. 2A and 2B are views showing output waveforms of a hall sensor signal and a shakiness signal in case of a shock caused by a part of the apparatus such as an operation of a shutter or a mirror.

The hall sensor 110 outputs a hall sensor signal corresponding to lens displacement caused by a shock. In embodiments, the hall sensor 110 is provided on the lens side and may be single or plural. The hall sensor signal output from the hall sensor 110 is as shown in FIG. 2A. As shown in FIG. 2A, displacement occurs due to a shock caused by an operation of the apparatus such as operation of a shutter or a mirror. In embodiments, a hall sensor, a hall device, or a magnetic unit attached to a shakiness corrector measures a position of a lens or a charge coupled device (CCD) to use the measured position as feedback information for shakiness correction.

Figure 2B:
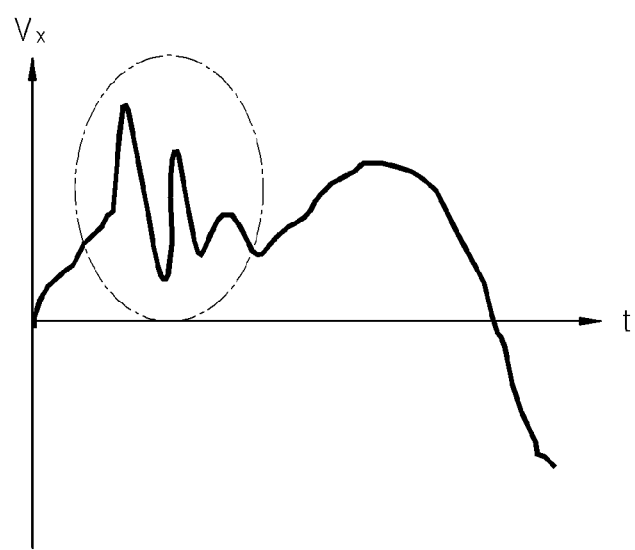

The shakiness detection unit 120 detects a shakiness signal generated from a digital photographing device. The shakiness detection unit 120 may include a gyroscope sensor, an angular-speed sensor, or an acceleration sensor. The shakiness signal detected by the shakiness detection unit 120 is as shown in FIG. 2B. When the hall sensor signal shown in FIG. 2A fluctuates due to a shock, the shakiness signal detected by the shakiness detection unit 120 fluctuates by more errors under the influence of the fluctuation of the hall sensor signal during corresponding time intervals or periods. As a result, if a shakiness correction control signal is generated by using the shakiness signal in the shock situation, more errors may be generated.

Figure 3A:
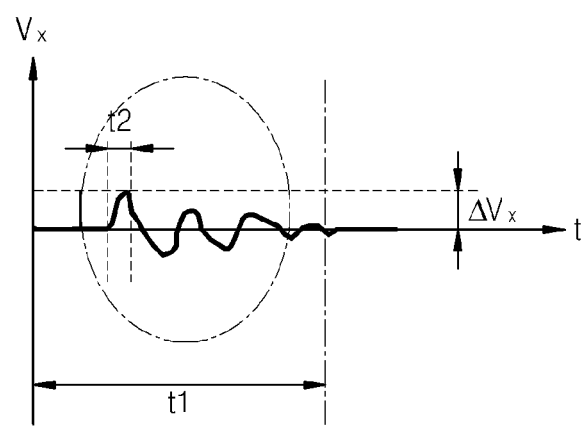
FIGS. 3A and 3B are views showing output waveforms of a hall sensor signal and a corrected shakiness signal in case of a shock caused by an operation of a shutter or a mirror.

In embodiments, the control unit 130 controls the overall operation of the apparatus 100. The control unit 130 may be provided on the lens side to communicate with a central control unit provided on the body side, e.g., a microprocessor unit. The control unit 130 may be the microprocessor unit. The control unit 130 determines whether the hall sensor signal output from the hall sensor 110 exceeds a first threshold value and generates a shakiness correction control signal for performing shakiness correction, depending on a result of the determination. The first threshold value, which can be determined arbitrarily, indicates an output value of the hall sensor signal, for example, a peak value of a detected voltage value. The control unit 130 then determines whether a fluctuation period of the peak value lasts for a predetermined time. As shown in FIG. 3A, the control unit 130 determines whether the hall sensor signal is out of a peak value range $\Delta V_x$ for the hall sensor signal during a predetermined time t2. If the hall sensor signal is out of the peak value range $\Delta V_x$ during the time t2, the control unit 130 outputs the shakiness correction control signal by using previously stored shakiness data. On the other hand, if the hall sensor signal is not out of the peak value range $\Delta V_x$ during the time t2, the control unit 130 outputs the shakiness correction control signal by using the shakiness signal detected by the shakiness detection unit 120.

Figure 3B:
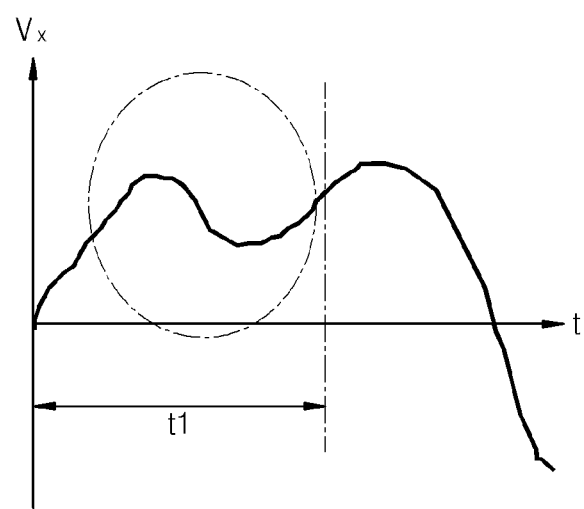

The storing unit 140 stores shakiness data for generating the shakiness correction control signal. In embodiments, the shakiness data is obtained by patterning or generalizing the shakiness signal. Referring back to FIGS. 2B and 3B, when a shock occurs due to a shutter or a mirror, the shakiness signal detected by the shakiness detection unit 120 abnormally fluctuates under the influence of the shock. To perform shakiness correction by reflecting only true shakiness, when the hall sensor signal is out of a predetermined range for a predetermined time period, the generalized shakiness data as shown in FIG. 3B is used instead of using the detected shakiness signal. Therefore, the apparatus for correcting shakiness according to an embodiment of the invention can perform shakiness correction by reflecting only true shakiness while avoiding the influence of the shock caused by an operation of the shutter or mirror.

After a predetermined time t1 has elapsed, the control unit 130 generates the shakiness correction control signal by using a currently detected shakiness signal, that is, a shakiness signal after the elapse of the time t1 as shown in FIG. 3B. Thus, at a moment when the influence of the shock caused by an operation of the shutter or mirror is ended, shakiness correction using the shakiness signal is resumed.

The shakiness correction unit 150 performs shakiness correction according to the shakiness correction control signal output from the control unit 130. The shakiness correction means an operation of moving a lens deviating from a right position due to shakiness back to the right position, that is, a lens position determined by focal strength calculation. The shakiness correction unit 150 may be a drive motor for driving a lens and the shakiness correction control signal may be a motor drive amount control signal.

Figure 4:
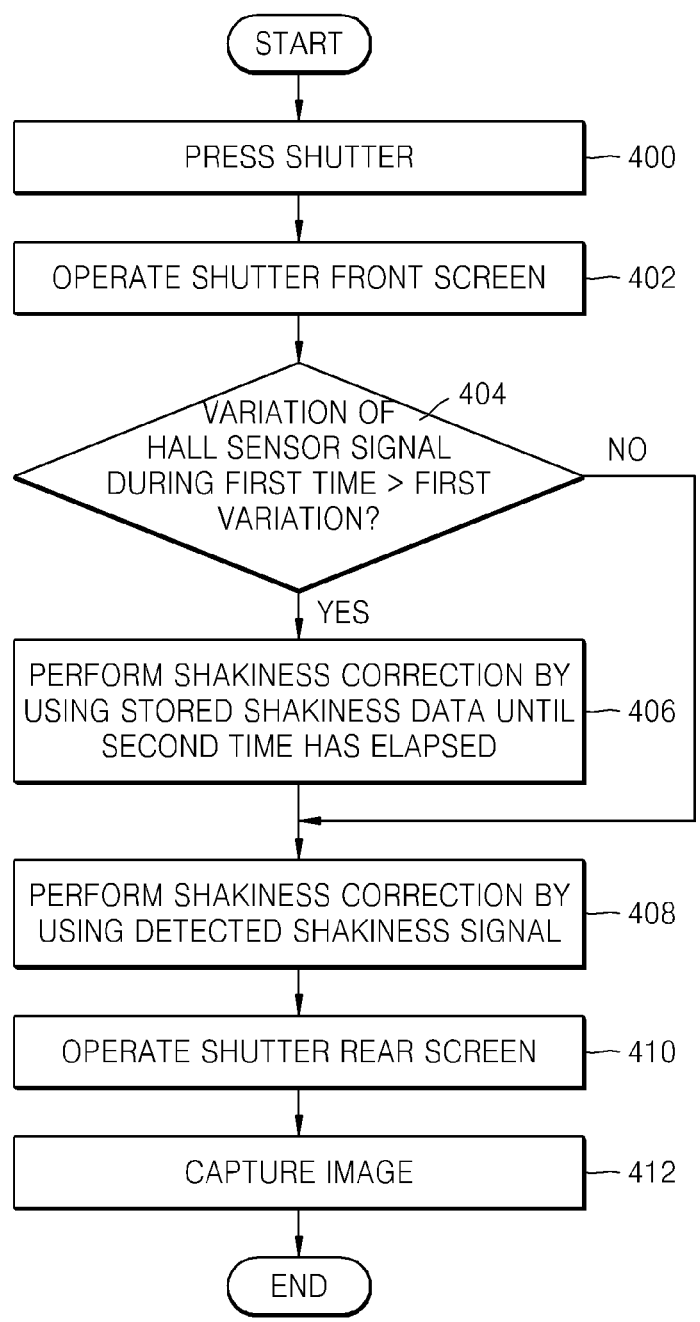
FIG. 4 is a flowchart illustrating a method of correcting shakiness according to another embodiment of the invention.

FIG. 4 is a flowchart illustrating a method of correcting shakiness according to another embodiment of the invention.

Referring to FIG. 4, in operations 400 and 402, upon the pressing of a shutter, a shutter front screen operates and light exposure starts. In operation 404, it is determined whether a variation of a hall sensor signal exceeds a first variation during a first time. If so, the process goes to operation 406 to perform shakiness correction by using previously stored shakiness data until a second time has elapsed. The first time refers to a time for guaranteeing that the fluctuation of the hall sensor signal lasts for a predetermined time, and the second time refers to a time for guaranteeing that the hall sensor signal returns to a normal range. The first time and the second time may be determined arbitrarily. In operation 408, shakiness correction is performed using a normally detected shakiness signal.

If it is determined in operation 404 that the variation of the hall sensor signal does not exceed the first variation during the first time, the process goes to operation 408 to perform shakiness correction using the detected shakiness signal.

Upon termination of the light exposure, a shutter rear screen operates in operation 410 and an image is captured in operation 412.

FIG. 5 is a flowchart illustrating a method of correcting shakiness according to another embodiment of the invention.

Referring to FIG. 5, in operations 500 and 502, a shock is sensed by using a hall sensor and a hall sensor signal corresponding to the shock is output. The shock means a shock caused by driving of a shutter or up/down movement of a mirror. In this case, the shock affects shakiness detection and thus shakiness correction cannot be performed normally.

In operation 504, it is determined whether a hall sensor signal exceeds a first threshold value during a first time. If so, the process goes to operation 506 to generate a shakiness correction control signal by using previously stored shakiness data and goes to operation 508 to perform shakiness correction according to the shakiness correction control signal generated in operation 506. In operation 510, it is determined whether a second time has elapsed. If so, the process goes to operation 512; otherwise, the process goes to operations 506 and 508 to perform shakiness correction by using previously stored shakiness data.

If it is determined in operation 504 that the hall sensor signal does not exceed the first threshold value during the first time, the process goes to operation 512 to generate a shakiness correction control signal by using the detected shakiness signal and goes to operation 514 to perform shakiness correction according to the shakiness correction control signal generated in operation 512.

As described above, according to the invention, shakiness is corrected by using shakiness data which considers shock compensation in advance by sensing a hall sensor signal in case of a shock caused by an operation of a shutter or a mirror, thereby minimizing an influence of other factors on shakiness correction and thus allowing accurate shakiness correction.

Moreover, in a lens-replaceable camera where a shock occurs due to a shutter or mirror in photographing, by providing the apparatus for correcting shakiness on a lens, an influence of the shock is structurally avoided, thus minimizing a negative influence upon shakiness correction performance.

Furthermore, when a hall sensor is moved by vibration caused by other factors than a shutter operation during photographing in a space where such vibration is perceived as powerful, for example, a factory subject to much vibration conditions, a vehicle on an unpaved road, a train, or the like, shakiness correction is performed by using previously programmed data, thereby allowing accurate shakiness correction.

The aforementioned embodiments have been described mainly on, but not limited to, a digital camera as an example of a digital photographing device to which the invention can be applied. It can be understood by those of ordinary skill in the art that the invention can also be applied to a camera phone having a camera function added thereto, a personal digital assistant (PDA), a portable multimedia player (PMP), and the like.

The various illustrative logics, logical blocks, modules, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium. The computer readable medium may be limited to a physical medium. The computer-readable recording medium can also be distributed over a network of coupled computer systems so that the computer-readable code is stored and executed in a decentralized fashion.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

While the invention has been particularly shown and described with reference to exemplary embodiments thereof, it will be understood by those of ordinary skill in the art that various changes in form and details may be made therein without departing from the spirit and scope of the invention as defined by the following claims. Accordingly, the disclosed embodiments should be considered in a descriptive sense not in a restrictive sense. The scope of the invention will be defined by the appended claims, and differences within a scope equivalent to the appended claims should be construed to be included in the invention.

What is claimed is:

1. A method of correcting shakiness, the method comprising:
   generating using a hall sensor a hall sensor signal corresponding to displacement;
   determining whether the hall sensor signal exceeds a first threshold value;
   generating a shakiness correction control signal according to a result of the determination and using previously stored shakiness data instead of using a detected shakiness signal, and
   performing shakiness correction according to the shakiness correction control signal.

2. The method of claim 1, wherein the determining step comprises determining after a predetermined first time period whether the hall sensor signal exceeded the first threshold value during the first time period.

3. The method of claim 2, wherein the step generating a shakiness correction comprises generating a shakiness correction control signal for performing shakiness correction using previously stored shakiness data until a second time has elapsed if the hall sensor signal exceeds the first threshold value during the first time period.

4. The method of claim 2, wherein the step generating a shakiness correction further comprises generating the shakiness correction control signal using the detected shakiness signal.

5. The method of claim 3, wherein the stored shakiness data is obtained by patterning the detected shakiness signal.

6. The method of claim 1, wherein the displacement is caused by an operation of a shutter or a mirror.

7. The method of claim 1, wherein the step generating a shakiness correction control signal comprises:
   if the hall sensor signal exceeds the first threshold value during a second time period, generating a shakiness correction control signal for performing shakiness correction using previously stored shakiness data until a first time period has elapsed, and
   if the hall sensor signal does not exceed the first threshold value during the second time period, generating the shakiness correction control signal for performing shakiness correction using the detected shakiness signal.

8. The method of claim 7, wherein the hall sensor is configured to measure the shake of a movable part which is moved in response to the shakiness correction control signal and the step generating a shakiness signal is performed by a device configured to measure the shake of an apparatus the method is performed on.

9. The method of claim 7, wherein the first time period begins when the displacement occurred.

10. A method of correcting shakiness, the method comprising:
    generating using a hall sensor a hall sensor signal corresponding to displacement;
    generating a shakiness signal;
    determining after a predetermined first time period whether the hall sensor signal exceeded the first threshold value during the first time period;
    generating a shakiness correction control signal using the generated shakiness signal if the hall sensor signal does not exceed the first threshold value during the first time period;
    generating a shakiness correction control signal according to a result of the determination and previously stored shakiness data if the hall sensor signal does exceed the first threshold value during the first time period; and
    performing shakiness correction according to the shakiness correction control signal.

11. An apparatus for correcting shakiness, the apparatus comprising:
    a hall sensor configured to output a hall sensor signal corresponding to displacement;
    a control unit configured to determine whether the hall sensor signal exceeds a first threshold value and to generate a shakiness correction control signal according to a result of the determination and using previously stored shakiness data instead of a detected shakiness signal; and
    a shakiness correction unit configured to perform shakiness correction according to the shakiness correction control signal.

12. The apparatus of claim 11, wherein the control unit is configured to determine after a predetermined first time period whether the hall sensor signal exceeded the first threshold value during a first time period.

13. The apparatus of claim 12, further comprising a storing unit storing shakiness data for generating the shakiness correction control signal, wherein the control unit is configured to generate the shakiness correction control signal for performing shakiness correction using the previously stored shakiness data until a second time period has elapsed if the hall sensor signal exceeds the first threshold value during the first time period.

14. The apparatus of claim 13, further comprising a shakiness detection unit configured to generate the shakiness signal, wherein the control unit is configured to generate the shakiness correction control signal using the shakiness signal generated by the shakiness detection unit.

15. The apparatus of claim 14, wherein the control unit is further configured to generate the shakiness correction control signal by using the shakiness signal generated by the shakiness detection unit if the hall sensor signal does not exceed the first threshold value during the first time period.

16. The apparatus of claim 14, wherein the control unit is configured to obtain the shakiness data by patterning the shakiness signal generated by the shakiness detection unit.

17. The apparatus of claim 11, wherein the displacement is caused by an operation of a shutter or a mirror.

18. The apparatus of claim 11, further comprising:
    a shake detection unit configured to generate the shakiness signal,
    wherein the control unit is further configured to:
    generate a shakiness correction control signal for performing shakiness correction using previously stored shakiness data until a second time period has elapsed, if the hall sensor signal exceeds the first threshold value during the first time period, and
    generate the shakiness correction control signal for performing shakiness correction using the detected shakiness signal, if the hall sensor signal does not exceed the first threshold value during the first time period.

19. The apparatus of claim 18, wherein the hall sensor is configured to measure the shake of a device configured to move in response to the shakiness correction control signal and the shake detection unit is configured to generate the shakiness signal based on measuring the shake of the apparatus.

20. A non-transitory recording medium having recorded thereon a program for executing a method of claim 1 on a computer.

* * * * *